(12) United States Patent
Polk

(10) Patent No.: US 7,805,459 B2
(45) Date of Patent: Sep. 28, 2010

(54) EXTENSIBLE CONTROLS FOR A CONTENT DATA REPOSITORY

(75) Inventor: Ray Polk, Erie, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 0 days.

(21) Appl. No.: 11/561,343

(22) Filed: Nov. 17, 2006

(65) Prior Publication Data

US 2007/0124326 A1 May 31, 2007

Related U.S. Application Data

(63) Continuation-in-part of application No. 11/366,268, filed on Mar. 2, 2006.

(60) Provisional application No. 60/737,621, filed on Nov. 17, 2005, provisional application No. 60/742,186, filed on Dec. 2, 2005.

(51) Int. Cl.
*G06F 7/00* (2006.01)
*G06F 17/30* (2006.01)

(52) U.S. Cl. .................. 707/790; 707/802; 707/803; 715/255

(58) Field of Classification Search ............ 707/103 R, 707/103 Y, 103 X, 103 Z, 1–206; 715/255
See application file for complete search history.

(56) References Cited

U.S. PATENT DOCUMENTS

| | | | |
|---|---|---|---|
| 5,321,841 A | 6/1994 | East et al. | |
| 5,446,842 A | 8/1995 | Schaeffer et al. | |
| 5,463,555 A | 10/1995 | Ward et al. | |
| 5,471,629 A | 11/1995 | Risch | |
| 5,530,861 A | 6/1996 | Diamant et al. | |
| 5,630,069 A | 5/1997 | Flores et al. | |
| 5,634,127 A | 5/1997 | Cloud et al. | |

(Continued)

FOREIGN PATENT DOCUMENTS

WO    2005/114383    12/2005

OTHER PUBLICATIONS

Christophe Laurer, "Introducing Microsoft.net", Jul. 2, 2002; pp. 1-10; http://web.archive.org/web/20020702162429/http://www.freevbcode.com/ShowCode.asp?ID=2171.

(Continued)

*Primary Examiner*—Mohammad Ali
*Assistant Examiner*—Angelica Ruiz
(74) *Attorney, Agent, or Firm*—Fliesler Meyer LLP

(57) ABSTRACT

An extensible control interface is provided to simplify access to the content management repository. Developers can write extension interfaces associated with new data types, where the extension interfaces extend the extensible control and are annotated with the control extension annotation. These new interfaces can specify the repository name and declare various methods annotated with annotations. Parameters of the various methods can also be annotated to supply needed information. Using an annotation process tool (APT), the developer can generate the bean and implementation classes and the methods can subsequently be called upon to perform operations on types in the repository. For example, the extensible control can take care of interacting with the type manager to perform the needed actions within the repository in order to create the new object classes and nodes. Object classes can be created on the first call, while node instances upon each call of the create method.

20 Claims, 3 Drawing Sheets

U.S. PATENT DOCUMENTS

| | | | |
|---|---|---|---|
| 5,694,563 A | 12/1997 | Belfiore | |
| 5,704,017 A | 12/1997 | Heckerman et al. | |
| 5,748,975 A | 5/1998 | Van De Vanter | |
| 5,812,793 A | 9/1998 | Shakib et al. | |
| 5,835,769 A | 11/1998 | Jervis et al. | |
| 5,835,911 A | 11/1998 | Nakagawa et al. | |
| 5,836,014 A | 11/1998 | Faiman, Jr. | |
| 5,848,424 A | 12/1998 | Scheinkman et al. | |
| 5,877,765 A | 3/1999 | Dickman | |
| 5,913,061 A | 6/1999 | Gupta et al. | |
| 5,926,798 A | 7/1999 | Carter | |
| 5,931,900 A | 8/1999 | Notani et al. | |
| 5,941,945 A | 8/1999 | Aditham et al. | |
| 5,960,404 A | 9/1999 | Chaar et al. | |
| 5,961,593 A | 10/1999 | Gabber et al. | |
| 5,983,214 A | 11/1999 | Lang et al. | |
| 5,995,945 A | 11/1999 | Notani et al. | |
| 6,002,402 A | 12/1999 | Schacher | |
| 6,018,716 A | 1/2000 | Denardo et al. | |
| 6,044,217 A | 3/2000 | Brealey et al. | |
| 6,052,684 A | 4/2000 | Du | |
| 6,064,980 A | 5/2000 | Jacobi et al. | |
| 6,067,623 A | 5/2000 | Blakley, III et al. | |
| 6,073,109 A | 6/2000 | Flores et al. | |
| 6,073,138 A | 6/2000 | de l'Etraz et al. | |
| 6,088,679 A | 7/2000 | Barkley | |
| 6,098,054 A | 8/2000 | McCollom et al. | |
| 6,119,149 A | 9/2000 | Notani | |
| 6,122,666 A | 9/2000 | Beurket et al. | |
| 6,151,583 A | 11/2000 | Ohmura et al. | |
| 6,157,915 A | 12/2000 | Bhaskaran et al. | |
| 6,192,405 B1 | 2/2001 | Bunnell | |
| 6,212,548 B1 | 4/2001 | De Simone et al. | |
| 6,226,675 B1 | 5/2001 | Meltzer et al. | |
| 6,230,287 B1 | 5/2001 | Pinard et al. | |
| 6,233,591 B1 | 5/2001 | Sherman et al. | |
| 6,249,869 B1 | 6/2001 | Drupsteen et al. | |
| 6,330,569 B1 | 12/2001 | Baisley et al. | |
| 6,338,064 B1 | 1/2002 | Ault et al. | |
| 6,353,923 B1 | 3/2002 | Bogel et al. | |
| 6,393,456 B1 | 5/2002 | Ambler et al. | |
| 6,401,111 B1 | 6/2002 | Dan et al. | |
| 6,457,076 B1 | 9/2002 | Cheng et al. | |
| 6,493,006 B1 | 12/2002 | Gourdol et al. | |
| 6,523,027 B1 | 2/2003 | Underwood | |
| 6,539,404 B1 | 3/2003 | Ouchi | |
| 6,550,054 B1 | 4/2003 | Stefaniak | |
| 6,572,660 B1 | 6/2003 | Okamoto | |
| 6,578,046 B2 * | 6/2003 | Chang et al. | 707/103 R |
| 6,594,693 B1 | 7/2003 | Borwankar | |
| 6,604,198 B1 | 8/2003 | Beckman et al. | |
| 6,640,249 B1 | 10/2003 | Bowman-Amuah | |
| 6,677,964 B1 | 1/2004 | Nason et al. | |
| 6,701,314 B1 | 3/2004 | Conover et al. | |
| 6,714,219 B2 | 3/2004 | Lindhorst et al. | |
| 6,732,237 B1 | 5/2004 | Jacobs et al. | |
| 6,745,238 B1 | 6/2004 | Giljum et al. | |
| 6,795,967 B1 | 9/2004 | Evans et al. | |
| 6,802,000 B1 | 10/2004 | Greene et al. | |
| 6,804,686 B1 | 10/2004 | Stone et al. | |
| 6,829,662 B2 | 12/2004 | King-Smith et al. | |
| 6,839,769 B2 | 1/2005 | Needham et al. | |
| 6,859,931 B1 | 2/2005 | Cheyer et al. | |
| 6,938,216 B1 | 8/2005 | Ishisaki | |
| 6,944,655 B1 | 9/2005 | Bellamy et al. | |
| 6,983,288 B1 | 1/2006 | Kirkwood et al. | |
| 6,987,726 B1 | 1/2006 | Elliott | |
| 7,120,625 B2 | 10/2006 | Kagimasa et al. | |
| 7,149,959 B1 | 12/2006 | Jones | |
| 7,159,234 B1 | 1/2007 | Murphy et al. | |
| 7,171,619 B1 | 1/2007 | Bianco | |
| 7,203,731 B1 | 4/2007 | Coates | |
| 7,251,785 B1 | 7/2007 | Howard | |
| 7,269,792 B2 | 9/2007 | Consolatti et al. | |
| 7,305,436 B2 | 12/2007 | Willis | |
| 7,308,583 B2 | 12/2007 | Matsuzaki et al. | |
| 7,343,379 B2 | 3/2008 | Marvin et al. | |
| 7,349,949 B1 | 3/2008 | Connor et al. | |
| 7,376,739 B2 | 5/2008 | Ramaswamy et al. | |
| 7,404,141 B1 | 7/2008 | Giljum et al. | |
| 7,406,510 B1 | 7/2008 | Feldman | |
| 7,444,597 B2 | 10/2008 | Perantatos et al. | |
| 7,472,350 B2 | 12/2008 | Hintermeister et al. | |
| 7,590,430 B1 | 9/2009 | Urbanek | |
| 2001/0037367 A1 | 11/2001 | Iyer | |
| 2002/0016759 A1 | 2/2002 | Macready et al. | |
| 2002/0075325 A1 | 6/2002 | Allor et al. | |
| 2002/0076025 A1 | 6/2002 | Liversidge et al. | |
| 2002/0078365 A1 | 6/2002 | Burnett et al. | |
| 2002/0122076 A1 | 9/2002 | Nakaki | |
| 2002/0165936 A1 | 11/2002 | Alston et al. | |
| 2002/0196273 A1 | 12/2002 | Krause | |
| 2003/0004956 A1 | 1/2003 | Johnson et al. | |
| 2003/0018665 A1 | 1/2003 | Dovin et al. | |
| 2003/0037052 A1 | 2/2003 | Kitain et al. | |
| 2003/0041198 A1 | 2/2003 | Exton et al. | |
| 2003/0058277 A1 | 3/2003 | Bowman-Amuah | |
| 2003/0103603 A1 | 6/2003 | Kurita et al. | |
| 2003/0110117 A1 | 6/2003 | Saidenberg et al. | |
| 2003/0126436 A1 | 7/2003 | Greenberg et al. | |
| 2003/0131050 A1 | 7/2003 | Vincent | |
| 2003/0167315 A1 | 9/2003 | Chowdhry et al. | |
| 2003/0182375 A1 | 9/2003 | Zhu et al. | |
| 2003/0192030 A1 | 10/2003 | Hostettler | |
| 2003/0204429 A1 | 10/2003 | Botscheck et al. | |
| 2003/0226107 A1 | 12/2003 | Pelegri-Llopart et al. | |
| 2004/0001094 A1 | 1/2004 | Unnewehr et al. | |
| 2004/0015548 A1 | 1/2004 | Lee | |
| 2004/0015865 A1 | 1/2004 | Cirone et al. | |
| 2004/0034687 A1 | 2/2004 | Friedman | |
| 2004/0039934 A1 | 2/2004 | Land et al. | |
| 2004/0046804 A1 | 3/2004 | Chang | |
| 2004/0073615 A1 | 4/2004 | Darling | |
| 2004/0078435 A1 | 4/2004 | Dunbar et al. | |
| 2004/0078455 A1 | 4/2004 | Eide et al. | |
| 2004/0107212 A1 | 6/2004 | Friedrich et al. | |
| 2004/0111467 A1 | 6/2004 | Willis | |
| 2004/0133440 A1 | 7/2004 | Carolan et al. | |
| 2004/0133460 A1 | 7/2004 | Berlin | |
| 2004/0133660 A1 | 7/2004 | Junghuber et al. | |
| 2004/0136511 A1 | 7/2004 | Schwartz et al. | |
| 2004/0145608 A1 | 7/2004 | Fay et al. | |
| 2004/0158610 A1 | 8/2004 | Davis et al. | |
| 2004/0172279 A1 | 9/2004 | Carolan et al. | |
| 2004/0183831 A1 | 9/2004 | Ritchy et al. | |
| 2004/0205566 A1 | 10/2004 | Aggarwal | |
| 2004/0225995 A1 | 11/2004 | Marvin et al. | |
| 2004/0243928 A1 | 12/2004 | Hesmer et al. | |
| 2005/0021531 A1 | 1/2005 | Wen et al. | |
| 2005/0039141 A1 | 2/2005 | Burke et al. | |
| 2005/0050073 A1 * | 3/2005 | Demiroski et al. | 707/100 |
| 2005/0060653 A1 | 3/2005 | Fukase | |
| 2005/0097111 A1 | 5/2005 | Mukherjee et al. | |
| 2005/0119793 A1 | 6/2005 | Amundson et al. | |
| 2005/0144563 A1 | 6/2005 | Hough et al. | |
| 2005/0149619 A1 | 7/2005 | Cowan et al. | |
| 2005/0203931 A1 | 9/2005 | Pingree et al. | |
| 2005/0212915 A1 | 9/2005 | Karasaki et al. | |
| 2005/0223310 A1 | 10/2005 | Wachholz-Prill et al. | |
| 2005/0234874 A1 | 10/2005 | Berlin et al. | |
| 2005/0240863 A1 | 10/2005 | Olander | |
| 2005/0262006 A1 | 11/2005 | Beartusk et al. | |
| 2005/0262007 A1 | 11/2005 | Beartusk et al. | |
| 2005/0262075 A1 | 11/2005 | Beartusk et al. | |

| | | |
|---|---|---|
| 2005/0262092 A1 | 11/2005 | Beartusk et al. |
| 2005/0262093 A1 | 11/2005 | Beartusk et al. |
| 2005/0262094 A1 | 11/2005 | Beartusk et al. |
| 2005/0262095 A1 | 11/2005 | Beartusk et al. |
| 2005/0262185 A1 | 11/2005 | Beartusk et al. |
| 2005/0273382 A1 | 12/2005 | Beartusk et al. |
| 2005/0273702 A1 | 12/2005 | Trabucco |
| 2005/0273714 A1 | 12/2005 | Beartusk et al. |
| 2005/0278294 A1 | 12/2005 | Beartusk et al. |
| 2005/0278518 A1 | 12/2005 | Ko et al. |
| 2006/0004690 A1 | 1/2006 | Beartusk et al. |
| 2006/0010125 A1 | 1/2006 | Beartusk et al. |
| 2006/0010205 A1 | 1/2006 | Beartusk et al. |
| 2006/0031234 A1 | 2/2006 | Beartusk et al. |
| 2006/0031497 A1 | 2/2006 | Beartusk et al. |
| 2006/0053194 A1 | 3/2006 | Schneider et al. |
| 2006/0053195 A1 | 3/2006 | Schneider et al. |
| 2006/0053380 A1 | 3/2006 | Spataro et al. |
| 2006/0100892 A1 | 5/2006 | Ellanti |
| 2006/0107314 A1 | 5/2006 | Cataldi |
| 2006/0122971 A1* | 6/2006 | Berg et al. ............ 707/3 |
| 2006/0167996 A1 | 7/2006 | Orsolini et al. |
| 2006/0173857 A1 | 8/2006 | Jackson |
| 2006/0184883 A1 | 8/2006 | Jerrard-Dunne et al. |
| 2006/0212822 A1 | 9/2006 | Facemire et al. |
| 2006/0218000 A1 | 9/2006 | Smith et al. |
| 2006/0225091 A1 | 10/2006 | Facemire et al. |
| 2006/0225094 A1 | 10/2006 | Facemire et al. |
| 2006/0277089 A1 | 12/2006 | Hubbard et al. |
| 2007/0006083 A1 | 1/2007 | Daniels et al. |
| 2007/0016650 A1 | 1/2007 | Gilbert et al. |
| 2007/0016872 A1 | 1/2007 | Cummins et al. |
| 2007/0043766 A1 | 2/2007 | Nicholas |
| 2007/0113201 A1 | 5/2007 | Bales et al. |
| 2007/0150834 A1 | 6/2007 | Muller et al. |
| 2007/0220580 A1 | 9/2007 | Putterman et al. |
| 2008/0250057 A1 | 10/2008 | Rothstein |

OTHER PUBLICATIONS

Lauren Gibbons Paul,"RosettaNet: Teaching Business to Work Together", Oct. 1, 1999; 4 pages, http://www.developer.com/xml/article.php/616641.

International Preliminary Report on Patentability and Written Opinion for PCT/US2006/009822 dated May 20, 2008, 11 pages.

Meyer, "Usability for Component-Based Portals", Jun. 1, 2002, 1 page, IBM.com.

Microsoft.com, "Windows XP Service Pack 2 Screen Dumps", 2001, 4 pages.

Barkley "Implementing Role-Based Access Control Using Object Technology", ACM RBAC Workshop, 1996, 6 pages.

* cited by examiner

EXTENSIBLE CONTROLS FOR A CONTENT DATA REPOSITORY

CLAIM OF PRIORITY

This application claims priority to U.S. Provisional Patent Application No. 60/737,621, filed Nov. 17, 2005, entitled "SYSTEM AND METHOD FOR PROVIDING A COMMUNITY FRAMEWORK IN A COLLABORATIVE COMPUTING ENVIRONMENT" and U.S. Provisional Patent Application No. 60/742,186, filed Dec. 2, 2005, entitled "SYSTEM AND METHOD FOR PROVIDING A COMMUNITY FRAMEWORK IN A COLLABORATIVE COMPUTING ENVIRONMENT WITH SEARCH CONTROLS" and this application is a Continuation-in-Part of U.S. patent application Ser. No. 11/366,268, filed Mar. 2, 2006, entitled "SYSTEM AND METHOD FOR PROVIDING EXTENSIBLE CONTROLS IN A COMMUNITIES FRAMEWORK" all of which are all hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related and cross-referenced to the following applications which are incorporated herein by reference:

U.S. patent application Ser. No. 11/366,268 entitled "SYSTEM AND METHOD FOR PROVIDING EXTENSIBLE CONTROLS IN A COMMUNITIES FRAMEWORK," by Cindy McMullen et al., filed on Mar. 2, 2006.

U.S. patent application Ser. No. 11/601,553 entitled "SYSTEM AND METHOD FOR PROVIDING EXTENSIBLE CONTROLS IN A COMMUNITIES FRAMEWORK," by Ray Polk et al., filed on Nov. 17, 2006.

U.S. patent application Ser. No. 11/367,519 entitled "SYSTEM AND METHOD FOR PROVIDING GENERIC CONTROLS IN A COMMUNITIES FRAMEWORK" by Cindy McMullen et al., filed Mar. 3, 2006.

FIELD OF THE INVENTION

The invention relates generally to content management and in particular to data type creation within a content data repository.

BACKGROUND OF THE INVENTION

Content and data management has become an integral part of a vast majority of various enterprises and other businesses struggling to keep up with the demands of today's ever changing technology. For example, a typical enterprise utilizes a myriad of databases, file systems, applications and other means to manage its digital content. In a common scenario, various vendors provide their own proprietary version of a content management application that extends a storage layer such as a relational database with service facilities that almost any modern content application requires.

With such growing popularity of content management systems, the need for a common standardized way to access the repositories has become apparent. The current content repository for Java technology specification, developed under the Java Community Process as JSR-170, attempts to provide a standard application programming interface (API) to meet such a need. JSR-170 API defines how an application and a content repository interact with respect to a number of content services. However, even with such standard interfaces various difficulties remain for software developers using these systems.

For example, the typical content management system has an API that the developer must learn in order to perform various tasks within the repository such as creating, editing, updating and removing data. When using the repository directly, a developer must also typically describe and define the data types in a separate configuration file. Code can then be written that is aware of the defined data types and this code is typically stored in a separate location within the system. This presents dual code maintenance difficulties. For example, when the developer wishes to modify or create new data types within the repository, both of these files must typically be edited in order to bring about the appropriate changes.

What is needed is a more direct and user-friendly approach to managing data within the content repository, one that enables developers to easily create new data types as well as modify and access existing content.

DETAILED DESCRIPTION

Figure 1:
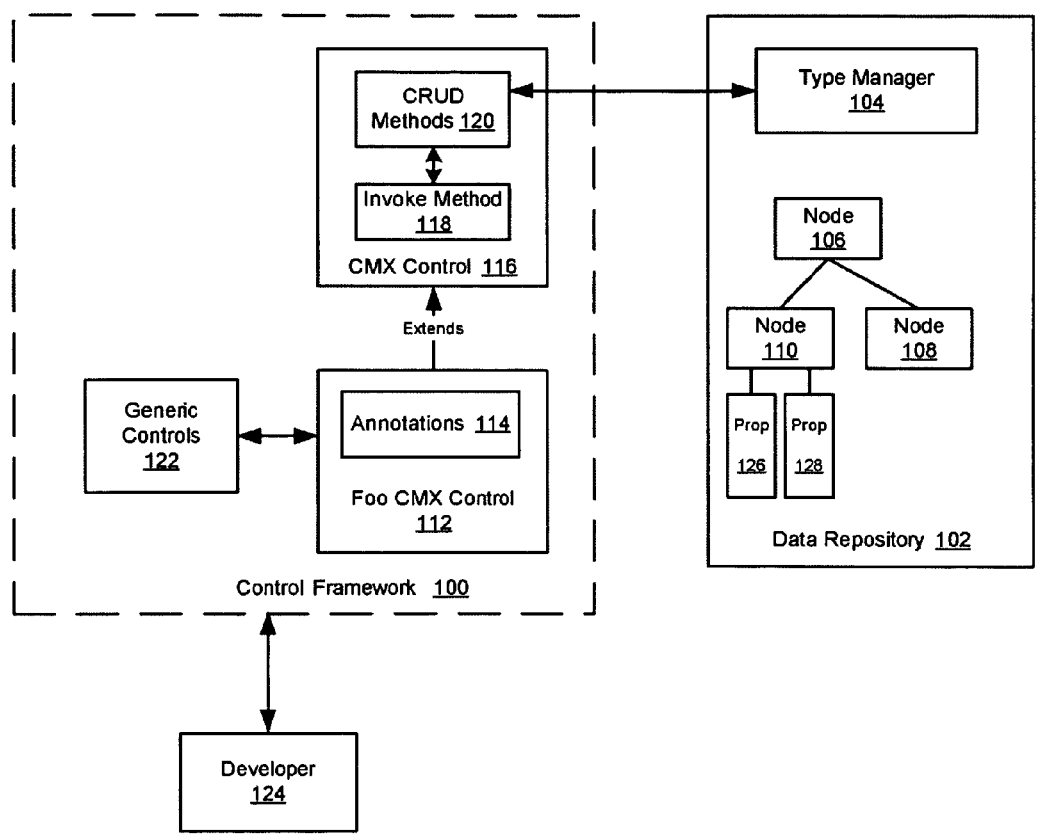
FIG. 1 is an exemplary illustration of the extensible controls feature, in accordance with various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a server. Furthermore, it can also be apparent to those skilled in the art that such components, regardless of how they are combined or divided, can execute on the same computing device or can be distributed among different computing devices connected by one or more networks or other suitable communication means.

In accordance with various embodiments of the invention, extensible controls are presented for allowing a developer to easily create and modify data types within the content repository. A control can be a reusable component that can encapsulate logic for use by various clients, such as applications in order to gain access to various resources such as EJBs, databases, web services, as well as other controls. Extensible controls can provide a simple and user friendly approach to managing data and performing various operations within the content repository.

In typical content management systems, data types are usually described in some form of a configuration file. Code can then be written that is aware of the data types defined in this file (e.g. various properties of the data type). Thus, if a user wished to create a new data type or add new properties to an existing data type he or she must usually edit both of these sources, i.e. the configuration file and the file containing the Java code. This form of dual code maintenance can be burdensome, especially in cases where users do not have security access to perform both operations.

Extensible controls can govern both of these functions from a single source of information in a programmatic and unified way based on annotations placed on various methods. As an illustration, the create method can be annotated with property information. Subsequently, if a developer wished to add a new property to that create method, he or she would need only to change that create method thereby adding a new property there, rather than having to maintain dual code/configuration information in several sources. Furthermore, since controls can be overridden by users upon instantiation, they can allow developers to change the data types or other features of the extensible controls. Thus, for example, at the time a control is instantiated, a client or user can override some of the values that are defined in that control, allowing for various changes to be implemented for a data type. The fact that the data is available via the annotation allows such extensibility of the various controls.

In various embodiments, a CMX (extensible) control is provided to simplify access to the content management repository. As an illustration, to create an object class and a node of a new type, a developer can write an extension interface for that new type, where the interface extends the CMX control and is annotated with the control extension annotation. This new interface can specify the repository name and declare a method annotated with a create annotation. One argument of this method can be annotated with a parent id annotation and another argument can be annotated with a property annotation to supply the needed type information. Using an annotation process tool (APT), a bean is generated from this new interface and the annotated create method can subsequently be called upon to create various new types in the repository. The CMX control can take care of interacting with the Type Manager to perform the needed actions within the repository in order to create the new type (i.e. the object class and the node). The object class can be created on the first call, and the node instances can be created upon each call of the create method.

FIG. 1 is an exemplary illustration of the extensible controls feature, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, the control framework 100 can include a basic CMX Control 116 as well as the extension of this basic control Foo CMX Control 112 interface which can be created by the developer 124 for a new data type within the content data repository 102. Data within the repository is normally stored in a hierarchy of nodes 106, 108 and 110, each of which can have one or more properties. A property object can represent the smallest granularity of content storage within the repository. In one embodiment, the property has exactly one parent node and has no children nodes. The property can consist of a name and a value associated with the name.

Each node can contain data that is of a specific data type. The data type can be specified by a simple Java object that wraps the node and provides information about the data contained in the node. Thus, the content type itself can be considered to be a bean type and all operations on the bean can be delegated to the node within the repository.

As an illustration, in order to create the new data type, an interface Foo CMX control 112 can be provided. This interface can include a number of annotations 114. These annotations are used to specify the various properties of the new data type node in the repository. For example, the Foo CMX control 112 can have a "create" method annotated with the annotation "@Create" so as to inform the CMX control 116 that this method will be used to create a data type in the repository. Of course, other such method definitions can be used to provide various other functionality such as "findby," "update," "move" and "delete" methods, all of which can be appropriately annotated. Furthermore, parameters on each of these methods can also be annotated to provide information about the properties for the new data type. For example, the parameters of the "create" method above can be annotated with the "@Property" annotation in order to specify what kind of properties the new data type will have.

The CMX control 116 can contain logic to translate the various annotations 114 of the Foo CMX control 112 into the content management types and creating the node within the repository 102. In one embodiment, the CMX control works with the Type manager 104 of the repository in order to look for the content type, lazily instantiate the type if it does not exist, and instantiate an instance of the node, once that type is created. In a similar fashion, the process of updating, deleting, moving and finding and performing other types of actions within the repository can be done via the Type manager working with the CMX control.

In this manner, extensible controls make finding a node by expression within the repository as simple as writing an annotation on an interface method, or creating a new data type within the repository and a new instance of that type as simple as writing a create annotation, defining properties and calling the method.

In various embodiments, generic controls 122 can also be provided as an abstraction layer above the extensible controls in order to encapsulate various business logic and high level functionality associated with various content.

Figure 2:
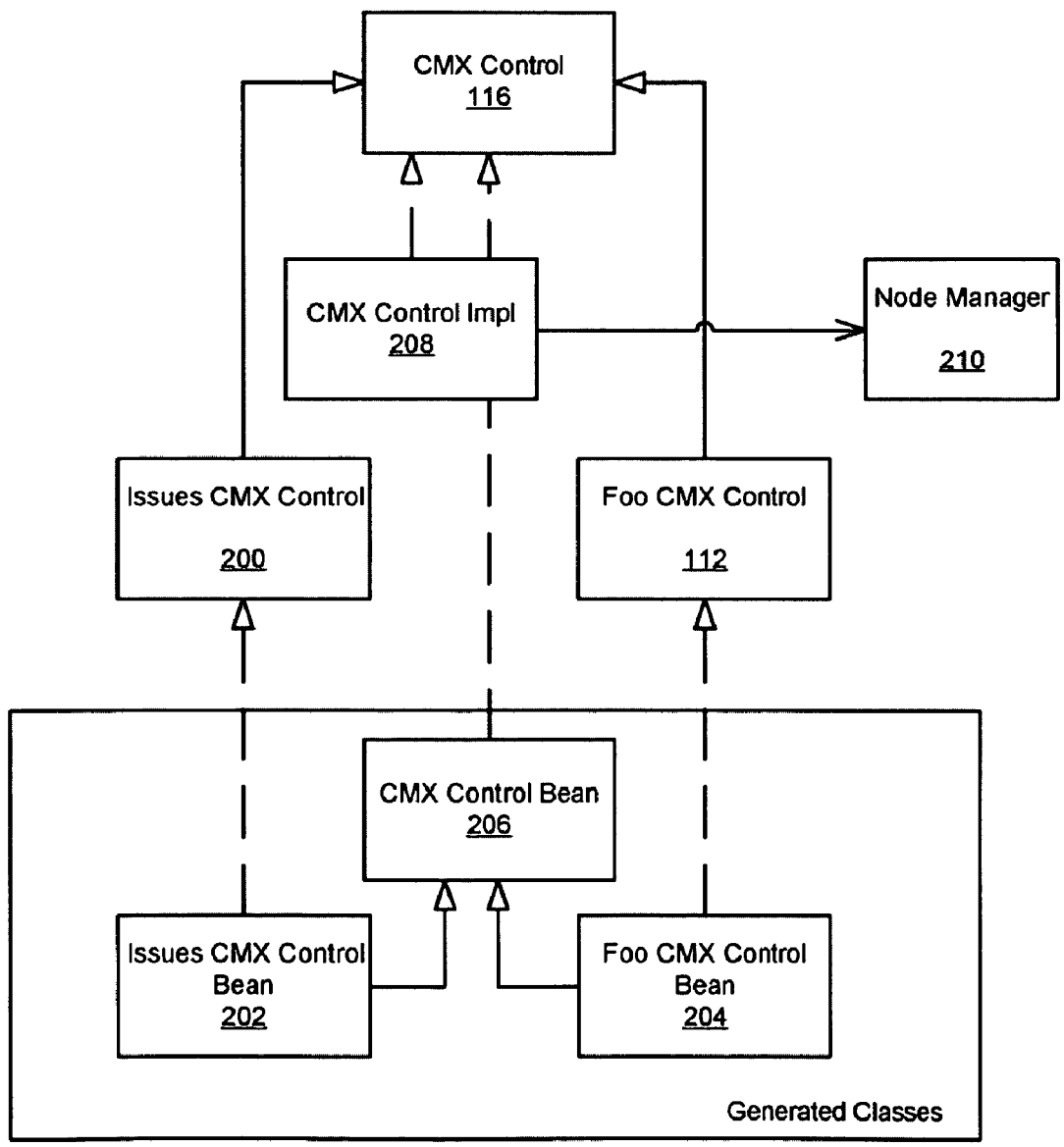
FIG. 2 is an exemplary illustration of a possible extensible controls class diagram, in accordance with various embodiments.

FIG. 2 is an exemplary illustration of a possible extensible controls class and interface diagram, in accordance with various embodiments. Although this diagram may depict components as logically separate, such depiction is merely for illustrative purposes. It will be apparent to those skilled in the art that the components portrayed in this or other figures can be combined or divided into separate software, firmware and/or hardware components. Furthermore and regardless of how they are combined or divided, these components can execute on the same computing device or can be distributed among different computing devices connected by one or more networks or other suitable communication means. Furthermore, it will also be apparent to a person skilled in the art that other such class and interface diagrams are possible and fall within the scope of the present invention.

As shown, the generated CMX Control bean 206 and the CMX Control Implementation class 208 can implement the CMX Control interface 116. The CMX Control Impl can be further related to the Node Manager class 210 which may have various methods such as the createNode( ) method. The Node Manager can perform various CRUD operations as required by the system.

In one embodiment, a developer may wish to create a new data type. For illustration purposes, one such data type may be called "Issues" and another can be named "foo." A developer can create an Issues CMX Control interface 200 and annotate the methods and method parameters therein. This Issues CMX Control interface can extend the extensible control CMX Control 116 interface. Similarly, the developer can write a Foo CMX Control interface 112 that is an extension of the original CMX Control and appropriately annotate its methods.

The APT and the compiler can generate the Issues CMX Control bean 202 and the Foo CMX Control Bean 204 classes, both of which implement the extensible CMX control interface and extend from the CMX control bean 206 (which is also generated by the APT). These generated classes can take care of interacting with the content repository and creating, reading and editing the various data types therein.

Figure 3:
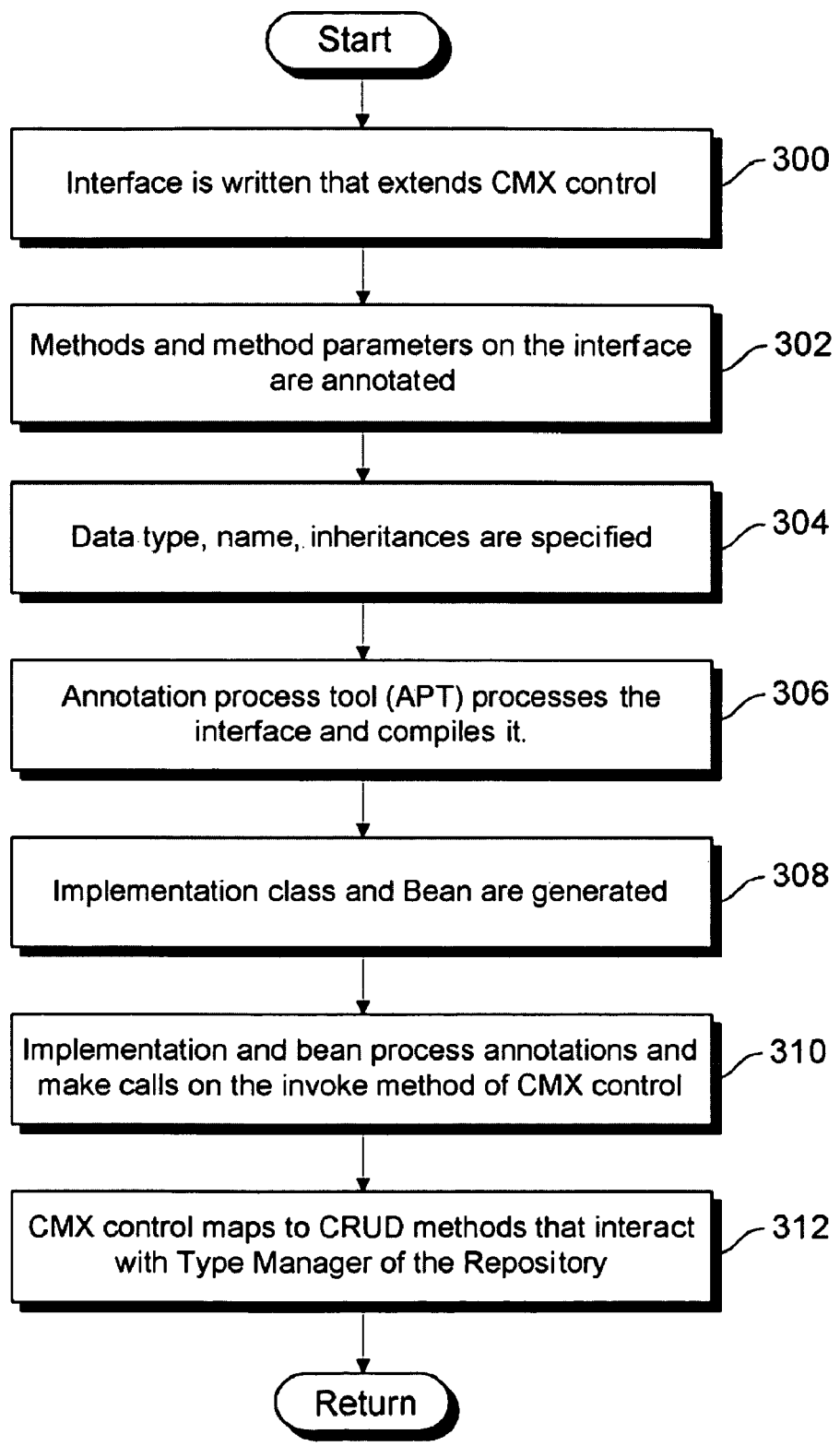
FIG. 3 is an exemplary flowchart illustration of the process of using the extensible controls in when creating a new data type, in accordance with various embodiments.

FIG. 3 is an exemplary flowchart illustration of the process of using the extensible controls in when creating a new data type, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 300, a developer can first create a file and name it corresponding to the name of the new data type. An interface for the data type can then be defined in this file. For example, this new interface can be the Foo CMX control 112 and it should preferably extend the extensible control 116 by having been annotated by the appropriate "@ControlExtension" annotation. This annotation can refer the compiler to the extensible control and inform it that this new interface is an extension of the extensible control.

In step 302, the developer can write method interfaces and annotate them appropriately. It should be noted the developer can be shielded from having to write any code that is specific to the content management system or know the details of how to create, read, update or delete nodes within the actual repository. For example, the developer can add a create method and annotate the method with a create annotation. In step 304, the developer can specify a type name for the new data type that is being created and optionally specify which existing data type this new type will extend.

In step 306, the new file can be processed using the annotation processing tool (APT) and the java compiler in order to generate an implementation class and the bean. Thus, following the example above, a "Foo CMX control Impl" and a "Foo CMX control Bean" would be generated by the APT, as shown in step 308.

In step 310, this implementation class and bean can process the various annotations that are placed on the methods in the Foo CMX control and provide them to the control context. In step 312, after processing the annotations, they can make calls to the invoke method of the CMX control. In one embodiment, the CMX control has a number of methods which correspond to the various annotations placed on the Foo CMX control methods. Thus, as illustrated in step 314, for every method call on Foo CMX control, an invoke method is called upon in CMX control which then redirects those methods into the corresponding CRUD methods in the CMX control which handle the interaction with the Type Manager of the content repository.

A non-limiting exemplary list of the various annotations used within the embodiments of the present invention is shown below:

| | | |
|---|---|---|
| static interface | CMXControl.Create | Method-level annotation for @ControlExtension methods to create CM node and object class |
| static interface | CMXControl.Delete | Method-level annotation for methods in a @ControlExtension which wish to delete CM nodes |
| static interface | CMXControl.Dynamic Properties | Parameter-level annotation to mark a parameter as a property |
| static interface | CMXControl.FindBy | Method-level annotation for methods in a @ControlExtension which wish to find CM nodes using an expression |
| static interface | CMXControl.FindById | Method-level annotation for methods in a @ControlExtension which wish to find CM nodes using an ID . . . returns a Node |
| static interface | CMXControl.Id | Parameter-level annotation |
| static interface | CMXControl.Move | Method-level annotation |
| static interface | CMXControl.ParentId | Parameter-level annotation |
| static interface | CMXControl.Property | Parameter-level annotation |
| static class | CMXControl.Property Pair | Holds a property and its corresponding PropertyDefinition |
| static interface | CMXControl.Repository Info | Class-level annotation for making a repositoryInfo available for use within the CMXControlImpl |
| static interface | CMXControl.Search Paths | Parameter-level annotation |
| static interface | CMXControl.SortOrder | Parameter-level annotation |
| static interface | CMXControl.Update | Method-level annotation |

One embodiment of this invention may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, Rams, EPROM's, EPRO'Ms, Drams, Rams, flash memory of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can also include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A system for providing extensible controls for a content data repository, the system comprising:
    a content repository, residing on a server with one or more processors, including a plurality of nodes to maintain data associated with a plurality of specific data types, wherein each of the plurality of nodes contains data in one of the plurality of specific data types;
    an extensible control residing on a server with one or more processors, said extensible control including an invoke method and a set of create, read, update and delete (CRUD) methods for performing specific operations within the content repository;
    and a plurality of extended control interfaces, wherein each extended control interface is extended from an extensible control interface and is associated with one of the plurality of nodes in the content repository that contains data in one of the plurality of specific data types, said extended control interface including one or more annotations to specify properties of said node in the content repository, wherein the extensible control interface contains logic to map the one or more annotations in the extended control interface into the specific data type and perform one or more operations on a node in the content repository that contains data in the specific data type, said one or more operations being mapped to the CRUD methods on the extensible control such that for every annotated method call on the extended control interface, a corresponding CRUD method is invoked on the extensible control in order to perform an appropriate operation in the content repository, wherein one operation is to programmatically create or modify a specific data type within the content repository instead of changing a configuration file.

2. The system of claim 1 wherein the content repository further includes:
    a type manager associated with the extensible control interface to perform operations associated with the content repository.

3. The system of claim 1 wherein each data type includes:
    an object class and a node in the content repository, said node being associated with said object class.

4. The system of claim 1, further comprising:
    an annotation processing tool (APT) and a Java compiler to process annotations within the extended control interface and to generate an implementation class and a bean that both implement the extensible control interface.

5. The system of claim 1 wherein each node within the repository is wrapped with a Java bean to specify the data type associated with the data contained by the node based on one of the extended control interface.

6. The system of claim 1, further comprising:
    a generic control to encapsulate business logic and abstracting functionality away from the extensible control.

7. The system of claim 1 wherein each node within the repository further includes: one or more properties that are comprised of a name and a value.

8. The system of claim 1 wherein said annotations in the extended control interface include at least one of method level annotations, parameter level annotations and class level annotations processed by an Annotation Processing tool.

9. The system of claim 8 wherein said annotations include one or more of:
create, delete, dynamic properties, find by, find by Id, Id, move, parent Id, property, property pair, repository info, search paths, sort order and update annotations.

10. A method for providing extensible controls for a content data repository, the method comprising:
maintaining data in a plurality of nodes within a content repository, said data associated with a plurality of data types, wherein each of the plurality of nodes contains data in one of the plurality of data types;
providing an extensible control interface that includes a set of create, read, update and delete (CRUD) methods for performing specific operations within the content repository, wherein one operation is to programmatically create or modify a specific data type within the content repository instead of changing a configuration file;
defining an extended control interface that is extended from the extensible control interface and is associated with one of the plurality of nodes in the content repository that contains data in one of the plurality of data types, said extended control interface including one or more annotations to specify properties of said node in the content repository, wherein the extensible control interface contains logic to map the one or more annotations in the extended control interface into the specific data type and perform one or more operations on a node in the content repository that contains data in the specific data type; invoking said method annotated with said annotation in the interface by a client application; and mapping said method annotated with said annotation to at least one of said CRUD methods on the extensible control.

11. The method of claim 10 wherein the content repository further includes:
a type manager associated with the extensible control interface to perform operations associated with the content repository.

12. The method of claim 10 wherein each data type includes:
an object class and a node in the content repository, said node being associated with said object class.

13. The method of claim 10, further comprising:
processing said at least one annotation by an annotation processing tool and a Java compiler in order to generate an implementation class and a bean that both implement the extensible control interface.

14. The method of claim 10 wherein each node within the repository is wrapped with a Java bean to specify the data type associated with the data contained by the node based on one of the extended control interface.

15. The method of claim 10 wherein each node within the repository further includes:
one or more properties that are comprised of a name and a value.

16. The method of claim 10 wherein said annotations in the extended control interface include at least one of method level annotations, parameter level annotations and class level annotations processed by an Annotation Processing tool.

17. The method of claim 10 wherein said annotations include one or more of:
create, delete, dynamic properties, find by, find by Id, Id, move, parent Id, property, property pair, repository info, search paths, sort order and update annotations.

18. A computer readable storage medium having instructions stored thereon which when executed by one or more processors, cause a system to:
maintain data in a plurality of nodes within a content repository, said data associated with a plurality of data types, wherein each of the plurality of nodes contains data in one of the plurality of data types;
provide an extensible control interface that includes a set of create, read, update and delete (CRUD) methods for performing specific operations within the content repository, wherein one operation is to programmatically create or modify a specific data type within the content repository instead of changing a configuration file;
define an extended control interface that is extended from the extensible control interface and is associated with one of the plurality of nodes in the content repository that contains data in one of the plurality of data types, said extended control interface including one or more annotations to specify properties of said node in the content repository, wherein the extensible control interface contains logic to map the one or more annotations in the extended control interface into the specific data type and perform one or more operations on a node in the content repository that contains data in the specific data type;
invoke said method annotated with said annotation in the interface by a client application; and
map said method annotated with said annotation to at least one of said CRUD methods on the extensible control.

19. The system of claim 1 wherein:
the extensible control interface contains one or more methods which correspond to annotations in each of the plurality of extended control interfaces, so that every method call on the extended control interface invokes a method in the extensible control interface to handle an interaction with the content repository.

20. The system of claim 4 wherein:
the APT and the compiler generate a bean that implements one of the plurality of extended control interfaces to interact with the content repository.

* * * * *